United States Patent
Kutkut

(10) Patent No.: US 6,664,762 B2
(45) Date of Patent: Dec. 16, 2003

(54) HIGH VOLTAGE BATTERY CHARGER

(75) Inventor: Nasser H. Kutkut, Madison, WI (US)

(73) Assignee: Power Designers, LLC, Madison, WI (US)

( * ) Notice: Subject to any disclaimer, the term of this patent is extended or adjusted under 35 U.S.C. 154(b) by 0 days.

(21) Appl. No.: 10/195,968

(22) Filed: Jul. 16, 2002

(65) Prior Publication Data

US 2003/0038612 A1 Feb. 27, 2003

Related U.S. Application Data

(60) Provisional application No. 60/314,156, filed on Aug. 21, 2001.

(51) Int. Cl.$^7$ .......................... H01M 10/44; H01M 10/46
(52) U.S. Cl. ........................................................ 320/116
(58) Field of Search ................................ 320/116, 118, 320/119, 120, 117, 137, 141, DIG. 28, DIG. 29, DIG. 30, DIG. 31

(56) References Cited

U.S. PATENT DOCUMENTS

| | | |
|---|---|---|
| 4,034,280 A | 7/1977 | Cronin et al. |
| 4,079,303 A | 3/1978 | Cox |
| 4,331,911 A | 5/1982 | Park |
| 5,003,244 A | 3/1991 | Davis, Jr. |
| 5,038,264 A | 8/1991 | Steigerwald |
| 5,594,320 A | 1/1997 | Pacholok et al. |
| 5,654,879 A | 8/1997 | Lopez et al. |
| 5,659,237 A | 8/1997 | Divan et al. |
| 5,814,970 A | 9/1998 | Schmidt |
| 5,821,729 A | 10/1998 | Schmidt et al. |
| 5,936,857 A | 8/1999 | Jacobs et al. |
| 6,150,795 A | 11/2000 | Kutkut et al. |

OTHER PUBLICATIONS

C.C. Chan, et al., "A Microprocessor Based Intelligent Battery Charger for Electric Vehicle Lead Acid Batteries," Electric Vehicle Symposium, EVS–10, pp. 456–466, Hong Kong, 1990.

*Primary Examiner*—Edward H. Tso
(74) *Attorney, Agent, or Firm*—Foley & Lardner

(57) ABSTRACT

A simple and flexible battery charger for charging high voltage battery strings includes a DC-to-AC converter that drives the primary of a transformer having multiple secondaries. Each secondary winding has a corresponding output stage formed of a rectification circuit, output inductor, and output capacitor. The output terminals of the output stages are connectable either in parallel or series. In either configuration, inductor current and capacitor voltage automatically balance among the output stage circuits. A controller normally regulates output terminal voltage by operating in voltage mode, but limits current by operating in a current mode when the average of inductor currents exceeds a specified limit. Reconfiguration from parallel to series, or vice versa, is obtained physical reconnection of the output stage terminals and adjustment of a single voltage feedback scaling factor. Connecting the output stages in series to produce a high voltage output reduces voltage stresses on the rectification circuits and enables use of Schottky diodes to avoid reverse recovery problems.

57 Claims, 12 Drawing Sheets

HIGH VOLTAGE BATTERY CHARGER

CROSS REFERENCE TO RELATED APPLICATION

This application claims the benefit of provisional patent application Ser. No. 60/314,156, filed Aug. 21, 2001, the disclosure of which is incorporated herein by reference.

FIELD OF THE INVENTION

This invention pertains generally to the field of battery charging and particularly to the high voltage charging of multiple cells or batteries connected in series.

BACKGROUND OF THE INVENTION

High voltage batteries are a critical element of several important applications such as electric vehicle drives. As with any battery, charging high voltage batteries is a complex electrochemical process in which a charging system replenishes a discharged battery by supplying to it a controlled amount of energy from an electric network. Achieving wide market acceptance for high voltage battery applications demands an economically viable system for charging high voltage batteries. Addressing this demand requires developing a low cost, high power density charging system that can supply a controlled charging current at high output voltages. However, realizing such a system requires overcoming certain practical problems related to the high output voltage.

In principle, a battery charger is a power supply with controllable voltage and current limits. What differentiates a battery charger from a conventional power supply is the capability to satisfy the unique requirements of a battery. Typically, battery chargers have two tasks to accomplish. The first, and most important, is to restore capacity as quickly as possible and the second is to maintain capacity by compensating for self-discharge and ambient temperature variations. These tasks are normally accomplished by controlling the output voltage and current of the charger in a preset manner, namely, using a charging algorithm.

The two most common charging algorithms are constant-voltage charging and constant-current charging. In constant-voltage charging, the voltage across the battery terminals is held constant, with the state of the battery determining the charge current level. The charging process normally terminates after a certain time limit is reached. Constant-voltage charging is most popular in float mode applications.

By contrast, constant-current charging holds the charging current constant. This method is often used in cyclic applications as it recharges the battery in a relatively short time.

There are many variations of the two basic methods using a succession of constant-current charging and constant-voltage charging to optimize battery charge acceptance. These variations, however, require a controlled charger with both voltage and current regulation capability.

Chargers are commonly divided into uncontrolled and controlled chargers. Uncontrolled chargers are the oldest, simplest, and cheapest chargers available. They are typically less efficient and have slow dynamic response. The simplest uncontrolled charger consists of a low frequency power transformer along with an uncontrolled bridge rectifier. Such a charger is suited for constant-voltage charging, where the battery's state of charge sets the charging current. The advantages of such chargers include simple structure and low cost. However, with these chargers, the output voltage depends on the input voltage and has considerable voltage ripple. In addition, this type of charger could cause damage to batteries because it lacks control of the charging current.

Alternatively, controlled chargers can overcome these limitations. Controlled chargers offer the ability to control the charging current as well as to implement both constant-voltage and constant-current charging methods. The simplest form of controlled chargers are SCR chargers, consisting of a low frequency transformer, an SCR bridge rectifier, and a DC choke. SCR chargers offer a simple and low cost solution to implement a fully controllable charging system. They are still in use in many low to high power industrial applications. However, SCR chargers are bulky and have relatively low efficiencies and slow dynamic response.

Transistor controlled chargers comprise another class of controlled chargers. They consist of a low frequency transformer, an uncontrolled bridge rectifier, and a series pass transistor. These chargers can implement both constant-voltage and constant-current charging methods and have fast dynamic response. However, they have low efficiencies and are generally bulky due to the low frequency transformer.

Switch mode power supply (SMPS) based chargers offer improved performance compared to the SCR and the transistor controlled chargers. These chargers offer high efficiency power conversion due to high frequency operation. The high frequency power conversion stage results in significant size reduction for the energy storage elements (transformers, inductors, and capacitors). In addition, these chargers have fast dynamic response. The basic components of an SMPS charger include an input filter stage, an input rectification stage, a power factor correction stage (if required), a high frequency power conversion power stage, a high frequency isolation transformer, and an output rectification and filtering stage. A central analog/digital controller is normally employed to regulate the charger voltage/current and to implement the desired charging algorithm. Considering that a well designed switch mode power supply is inherently current limited, the combination of constant-current and constant-voltage charge is available.

In order to implement both constant-voltage and constant-current charging methods, a SMPS charger would employ an output filtering stage that allows for output current limiting. This is typically achieved by using an inductive output filtering stage (DC choke), which smoothes the output charging current and limits it through the charger control circuitry. The inductor serves as the main energy storage device. Consequently, the charging current is smoothed out and is prevented from changing instantaneously. This allows the SMPS charger to implement accurate current limiting as well as protect against any short circuit conditions that may arise across the output terminals. The inductor current is normally sensed and regulated by the control circuitry to achieve the desired level of output current and to implement the constant-current intervals of the charging algorithm. An output capacitor is normally used to filter out any remaining current ripple in the filter inductor and thus supply a pure DC current to the battery. The voltage across the capacitor, which is the same as the battery voltage, is normally sensed and regulated by the control circuitry to achieve the desired level of output voltage and implement the constant-voltage intervals of the charging algorithm.

For low power battery charging needs (<1 kW), the single switch and the two switch forward converters are the simplest isolated SMPS battery charger topologies with an inductive output filtering stage. A battery charger using a single switch forward converter power stage may employ a half wave rectifier on the secondary side.

For high power charging needs (>1 kW), the full-bridge converter of the type shown in FIG. 1 (H-bridges of transistors $Q_1$–$Q_4$) with an inductive output filter $L_O$ is the most suitable power converter topology. A full wave rectifier composed of diodes D1–D4 is employed on the secondary side to rectify the primary voltage and current waveforms. Typically, a center-tapped (push-pull) or a full-bridge rectifier is used in association with a full-bridge converter topology. Typical voltage and current waveforms for the full-bridge SMPS charger are shown in FIG. 2. With an inductive output filtering stage, the secondary rectifiers are normally subjected to high voltage transients (ringing) during switching transitions. This is due to the reverse recovery of the output diodes where the transformer leakage inductance resonates with the secondary diodes' junction capacitance causing a two per-unit voltage stress across them. With an input DC bus voltage of VDC and a transformer turns ratio of 1:a, the diode voltage stress is approximately twice the transformer secondary voltage, namely 2·a·VDC. Consequently, the secondary diodes' voltage rating should be higher than twice the secondary reflected input DC bus voltage. The reverse recovery of the secondary diodes causes additional switching losses that become more dominant at higher switching frequencies. Improving the reverse recovery behavior of the secondary diodes, then, would directly improve overall charger performance and efficiency.

In order to alleviate ringing and switching losses associated with reverse recovery of power diodes, designers have used either Schottky diodes, which have no or minimal reverse recovery, or Ultrafast diodes, which have soft reverse recovery behavior. Both of these diode technologies have been extensively employed in SMPS and charger designs to yield improved performance and higher efficiency designs. Schottky diodes, however, are commercially available only in low voltage ratings, namely below 150V. Thus, their use has been restricted to low voltage battery chargers with battery voltages of less than 36V. On the other hand, Ultrafast diodes are offered in voltages of up to 1600V, which extends their use to high voltage SMPS applications. However, higher voltage Ultrafast diodes (e.g. 1200V diodes) do typically have higher reverse recovery characteristics compared with lower voltage ones (e.g. 600V diodes), resulting in performance degradation and lower efficiency. Thus the reverse recovery characteristic can be improved by circuit topologies that enable the use of lower voltage diodes, and preferably Schottky diodes.

With the advent of electric and hybrid electric vehicles, long battery strings consisting of tens of series-connected battery modules are becoming increasingly common. For example, a typical hybrid electric bus battery may consist of forty-eight 12V-battery modules with a nominal battery output voltage of 576V. Under charge, the battery voltage can be as high as 750V. This would require a battery charger capable of supplying a charging voltage of more than 750V. Assuming a battery amp-hour capacity is 50Ahrs and a 5-hour recharge time, an 800V/10A charger would be needed. Consequently, the charger power rating is 8kW. The full-bridge SMPS charger is well suited for this power level. Although the design of an 8kW full-bridge SMPS charger may sound quite straightforward, a number of issues would need to be resolved. Due to the high voltage nature of the charger (>750V), Schottky diodes cannot be used. As an alternative, Ultrafast diodes can be considered. Since the output voltage of the charger will be higher than 750V, the minimum voltage rating of the secondary diodes (D1–D4 in FIG. 1) is 1500V, or twice the output voltage. This would dictate the use of 1600V Ultrafast diodes. However, such diodes are not very common, as they are only offered by very few manufacturers. In addition, their reverse recovery performance is not as good as the reverse recovery performance of lower voltage Ultrafast diodes. Even if the 1600V diodes were used, their switching losses would limit the maximum converter switching frequency to a relatively low frequency, resulting in a lower power density charger. It is desirable to operate at higher switching frequencies in order to reduce the size of magnetic and capacitive filter components and to obtain a higher power density charger.

One approach that reduces the required voltage rating of the secondary rectifier diodes employs voltage clamps or snubber circuits. Voltage clamps act to clamp the voltage across the secondary diodes to a level lower than twice the charger output voltage. In this approach, the excess energy stored in the transformer leakage inductance is transferred to a clamp capacitor. The clamp capacitor discharges its energy to the load through a resistor. Part of the energy stored in the clamp capacitor is transferred to the load while the rest is dissipated as heat in the resistor. Such a clamp circuit allows the use of lower voltage diodes which would normally have improved reverse recovery characteristics and hence lower losses. For the 800V/10 A charger example described earlier, the use of a clamp capacitor may allow the use of 1200V diodes instead of 1600V parts. However, even with a clamp capacitor, the energy loss due to reverse recovery and the energy loss in the clamp resistor limit the maximum operating switching frequency, which limits charger power density.

In high voltage battery chargers, the ability to use diodes having low reverse recovery characteristics significantly reduces the stresses and losses associated with reverse recovery. Since lower voltage diodes have greatly improved reverse recovery behavior (e.g. 600V hyperfast and Stealth diodes), a converter topology for a high voltage battery charger that can use such lower voltage rating diodes would certainly exhibit improved performance. One approach that allows the use of lower voltage rating diodes is to connect the diodes in series. However, such an arrangement complicates the charger design because it requires additional circuitry to ensure voltage sharing during turn off.

Therefore, what is needed is a battery charger, a method of charging, and a suitable controller that permit the use of low reverse recovery diodes in charging high voltage strings of series-connected batteries. Furthermore, what is also needed is such a high voltage battery charging system capable of simple and flexible reconfiguration for charging lower voltages at higher currents. Furthermore, such a system is needed that is controllable to provide both constant-current charging and constant-voltage charging.

SUMMARY OF THE INVENTION

In accordance with the present invention, a high voltage battery charger is provided for efficiently and economically charging high voltage strings of series-connected batteries. The present invention provides for a plurality of secondary output terminals that can be arranged in series or parallel networks to adapt to a variety of output voltage and current levels. Reconfiguring the charger from one network arrangement to another requires simply adjusting a voltage feedback scale factor and rearranging the connections between the secondary output terminals and the battery charger output terminals. The battery charger of the invention can be controlled to operate selectively in either constant voltage or constant current mode charging.

The battery charger in accordance with the present invention includes a buck-based DC-to-AC converter circuit comprising an arrangement of controllable switching devices, having its input connected to a DC source and its output connected to one or more transformer primaries. The transformer may have a single primary and a plurality of secondary windings having preferably equal numbers of turns. Each secondary winding is connected to a corresponding secondary circuit. Each secondary circuit includes a rectification circuit connected across a respective secondary winding, where the AC input terminals of each rectification circuit are connected to the terminals of each corresponding secondary winding. The rectification circuit has a pair of DC output terminals connected to a low-pass L-C output filter, comprising an output inductor and an output capacitor. The positive and negative terminals of each output capacitor can be connected in either series or parallel networks to provide a range of output capabilities, including both maximum voltage capability and maximum current capability. Further, the battery charger includes a positive output terminal and a negative output terminal to provide for connection to a string of batteries to be charged. Within the network of output capacitors, the most positive output capacitor terminal connects to the positive output terminal and the most negative output capacitor terminal connects to the negative output terminal.

The controllable switching devices in the DC-to-AC converter can be any suitable devices known to those skilled in the art, but are preferably power MOSFETs or IGBTs. The DC-to-AC converter circuit is preferably a full-bridge inverter, but may alternatively comprise a half-bridge inverter or a forward converter. In a preferred embodiment, one branch of the DC-to-AC converter connects to a terminal of the primary winding through a DC blocking capacitor to prevent saturation of the transformer due to asymmetric inverter operation. The DC source can be any suitable DC voltage source, but preferably comprises a DC capacitor fed by a rectifier with its inputs connected to an AC source, such as, for example, the utility mains. The transformer can include any feasible number of secondary windings, but a transformer designed for charging a typical electric vehicle battery preferably has about six secondary windings. The rectification circuit in the preferred embodiment is preferably a full-wave bridge rectifier, but may be half-wave or free-wheeling diode networks adapted to operate in conjunction with the applied DC-to-AC converter circuit. The rectification circuit comprises a network of any suitable diodes, and preferably diodes having low reverse recovery characteristics, such as Schottky diodes, Ultrafast diodes, or Stealth diodes, for example. The output capacitors may be all parallel-connected, all series-connected, or connected in a plurality of strings of series-connected output capacitors wherein the strings of series-connected output capacitors are connected in parallel.

A battery charger controller in accordance with the present invention provides signals to control the controllable switching devices in the DC-to-AC converter. The controller provides an output signal on an output line to a pulse generator and gate drive circuit to cause the controllable switching devices in the DC-to-AC converter to switch on and off periodically at a selected frequency to couple energy from the primary winding to the circuits connected to the secondary windings. The controller utilizes a set of feedback signals proportional to the average current in the output inductors. In one embodiment, a summing circuit in the controller adds the signals in the set of feedback signals together to form an average current feedback signal representing the average of the currents flowing in the individual output inductors. The controller also accepts a signal comprising the voltage across the output terminals, which is preferably scaled to control signal levels by an adjustable voltage feedback scaling factor, kv.

The controller regulates the scaled signal representing the voltage across the output terminals to a commanded value, Vo_limit. To protect against over-current conditions, the controller compares the average current feedback signal to a specified current limit that establishes the maximum output current desired by the user. When the average current feedback signal is below the specified upper current limit the controller operates in constant-voltage mode and the controller operates in constant-current mode when the average current feedback signal exceeds the specified upper current limit.

The controller regulates the average current feedback signal using an inner control loop having a first control bandwidth, and regulates the voltage across the output terminals using an outer control loop at a second control bandwidth that is less than the first control bandwidth. Preferably, the second control bandwidth is less than or equal to 10% of the first bandwidth. The inner control loop of the controller further preferably includes a proportional-integral (PI) compensation network. The outer control loop of the controller also preferably includes a PI compensation network.

The present invention includes a current sensor to monitor each output inductor current signal in the set of feedback signals; these current signals are then summed in a summing circuit in the controller. The set of feedback signals to the controller can comprise signals formed by current sensors that accept windings of at least one turn from conductors in series with each output inductor, such as Hall effect current sensors. Preferably, the set of feedback signals is replaced by a single output signal from a current sensor comprising a core having at least one turn of each output inductor current. In the preferred embodiment, only a single turn of each output inductor current is used, and the resulting current sensor output signal represents the scaled sum of output inductor currents, the scaling depending on the number of turns of the sense winding. In this manner, the need for a summation circuit can be avoided.

Further objects, features, and advantages of the present invention will be apparent from the following detailed description when taken in conjunction with the accompanying drawings.

DETAILED DESCRIPTION OF THE INVENTION

Figure 3:
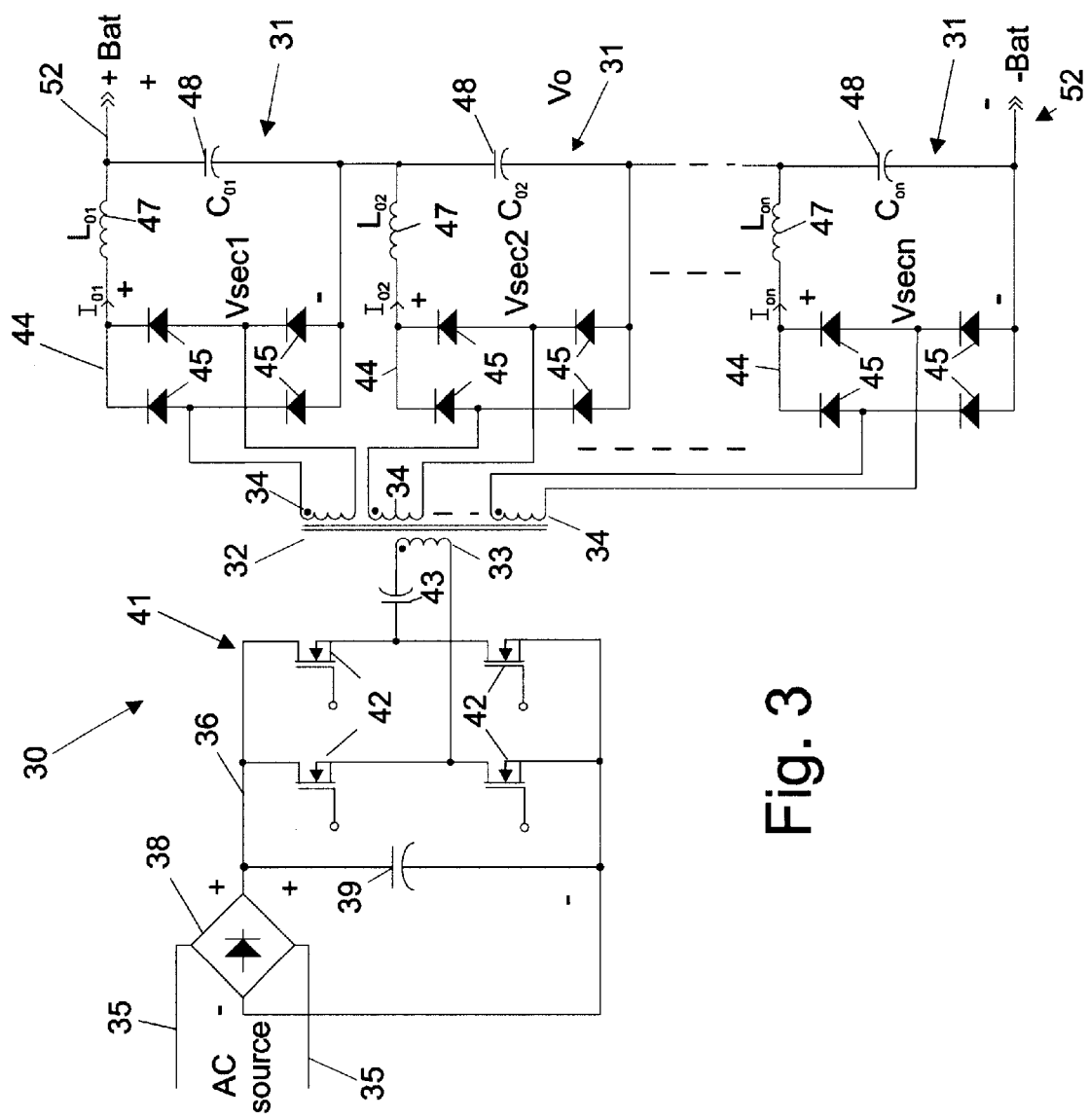
FIG. 3 is a general schematic circuit diagram of a full-bridge forward converter having multiple secondary circuits connected in series in accordance with the present invention.
Figure 4:
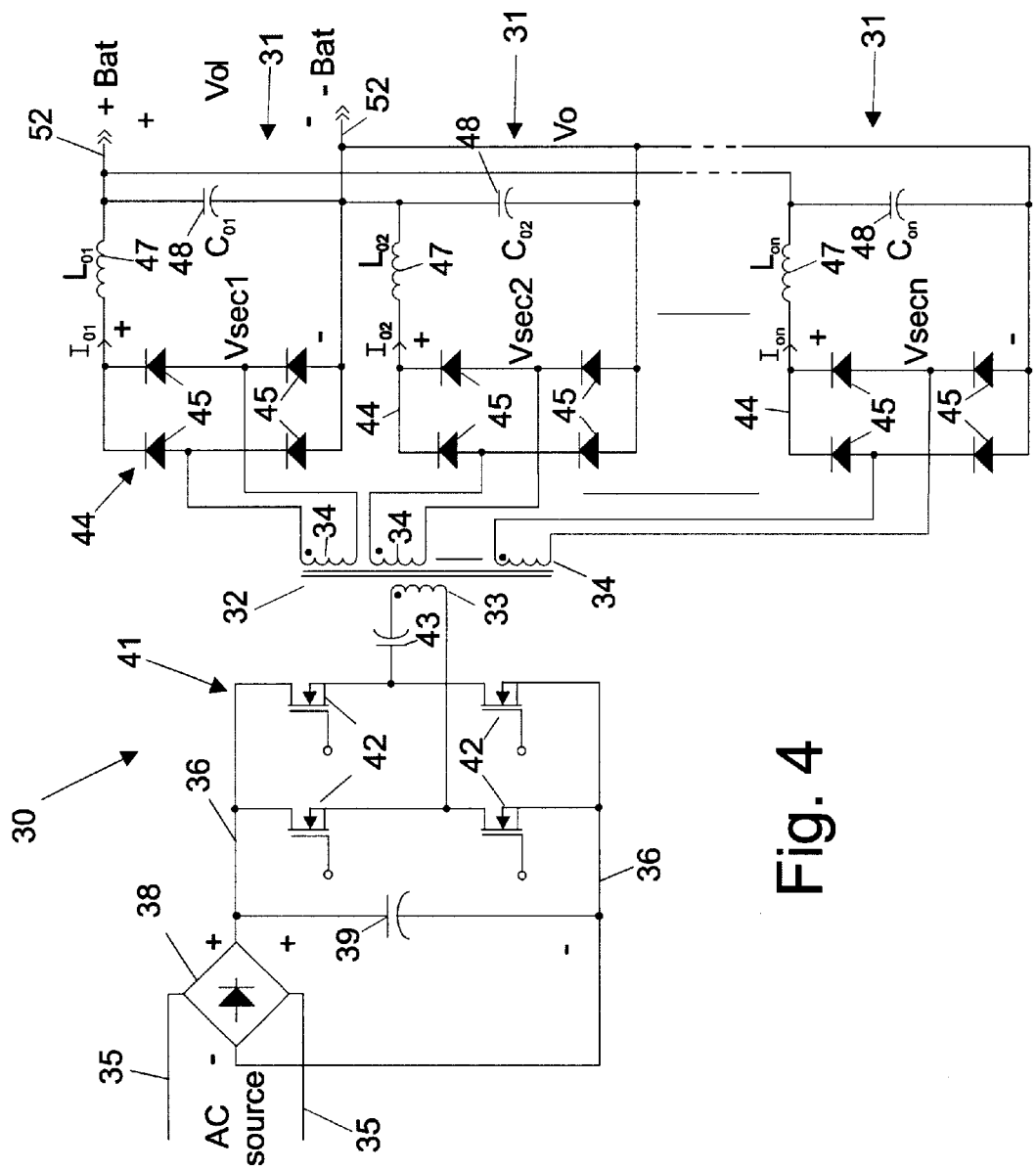
FIG. 4 is a full-bridge forward converter with multiple secondary circuits connected in parallel in accordance with the present invention.

A high voltage battery charger in accordance with the present invention includes a plurality of series-connected or parallel-connected low-voltage output stages with current regulation, automatic current and voltage sharing, and reconfigurable output voltage and current. With reference to the drawings, FIG. 3 shows a full-bridge (buck-based) high voltage SMPS battery charger 30 with multiple low-voltage output stage circuits 31. A multi-winding high frequency transformer 32, with a primary 33 and multiple secondaries 34 coupled to the primary, is used to supply the output stages. The output stages can be series-connected, as shown in FIG. 3, or parallel-connected, as shown in FIG. 4, to realize the desired output voltage and current level. Although a single transformer with multiple secondaries is preferred, multiple transformers may be utilized, each with a single primary and one or more secondaries. The series-connected configuration of FIG. 3 can be utilized to realize high voltage/low current output while the parallel-connected configuration of FIG. 4 can be utilized to realize low voltage/high current output. For both configurations, AC input power from an AC source (e.g., AC power mains) is supplied to input terminals 35. The AC power is converted to a DC voltage on DC bus lines 36 by a rectifier 38 (e.g., a full bridge of diodes) and a filter capacitor 39 to form a DC source, and the voltage on the DC bus lines 36 is inverted to an AC voltage and then applied to the primary 33 of the transformer 32 by a buck-based DC to AC converter (inverter) 41. In a preferred embodiment, the inverter 41 is formed of controlled switching devices 42 (e.g. MOSFETs) arranged in a bridge configuration. The AC output of the inverter 41 is coupled to the primary 33 of the transformer 32 through a DC blocking capacitor 43. Each of the output stages 31 include a rectification circuit 44, which may comprise, for example, full wave bridge rectifiers formed of diodes 45, and a low-pass L-C filter, formed of an output filter inductor 47 and an output capacitor 48. Other types of rectifiers may also be used.

The battery charger in accordance with the present invention can use lower voltage rated diodes in the rectification circuit than are required by conventional chargers. For example, for a 800V/10 A charger, two low voltage series-connected output stages 31 can be used, instead of a conventional high voltage single stage, to realize the desired high voltage output. If a snubber circuit is used, the voltage rating of the rectifier diodes 45 is only 600V instead of 1200V. Since reverse recovery losses are lower for 600V diodes than for 1200V diodes, a charger that can use the lower voltage rating diodes is more efficient and will allow operation at a switching frequency higher than that of a conventional charger. The higher switching frequency permits smaller magnetic and capacitive components and thereby enables increased charger power density.

In the present invention, the charger configurations of FIGS. 3 and 4 are controlled to ensure balancing of voltage on the output capacitors 48 of each output stage 31 in the series-connected configuration of FIG. 3, and to ensure sharing and balancing of the current in each of the output inductors 47 in the parallel-connected configuration of FIG. 4. Further, the charger in accordance with the invention may be controlled to implement both constant-voltage and constant-current charging methods.

Figure 1:
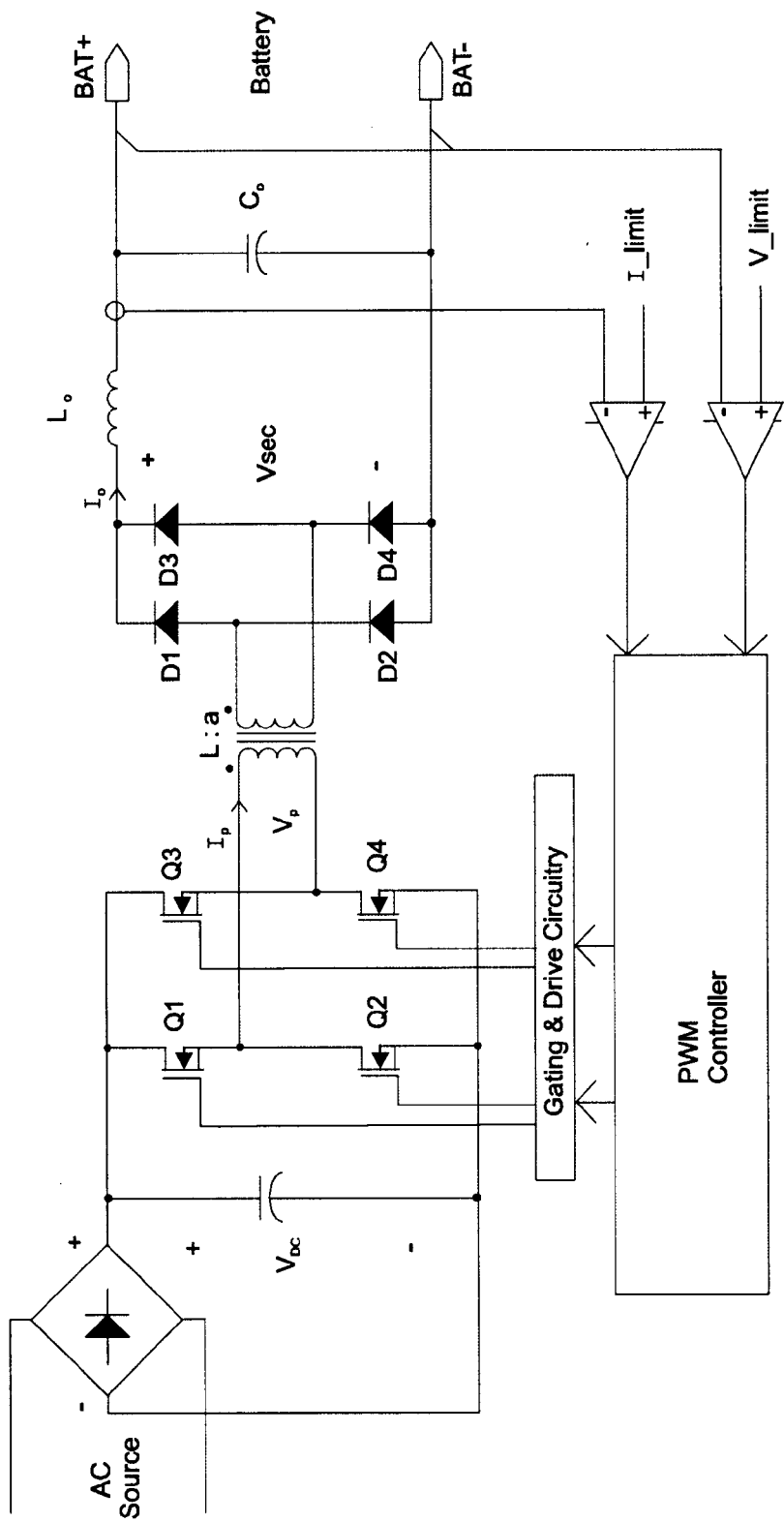
FIG. 1 is a schematic circuit diagram of a prior art full-bridge battery charger capable of low output voltage operation.
Figure 2:
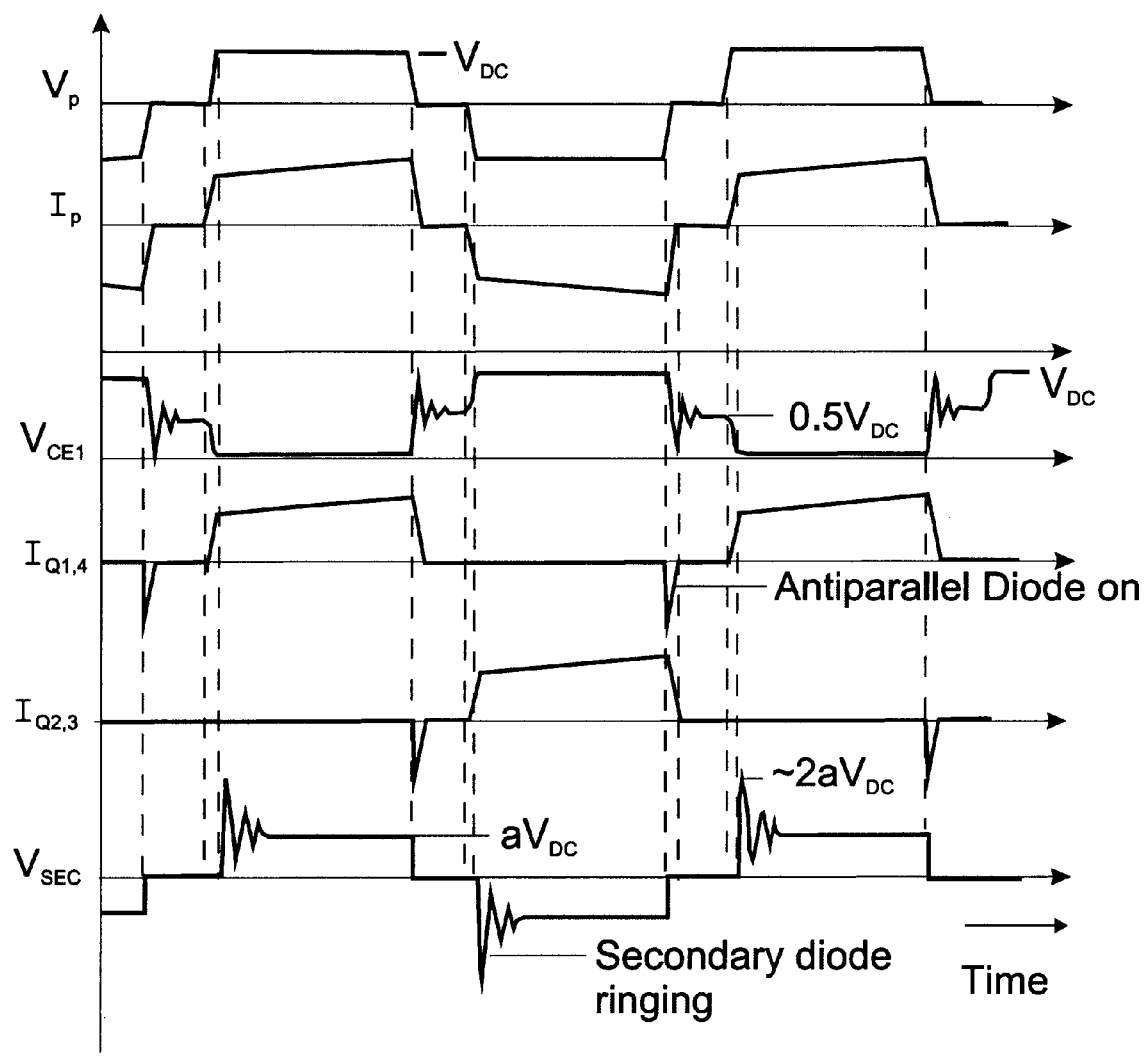
FIG. 2 are graphs of typical voltage and current waveforms of the full-bridge forward converter of the type shown in FIG. 1.
Figure 5:
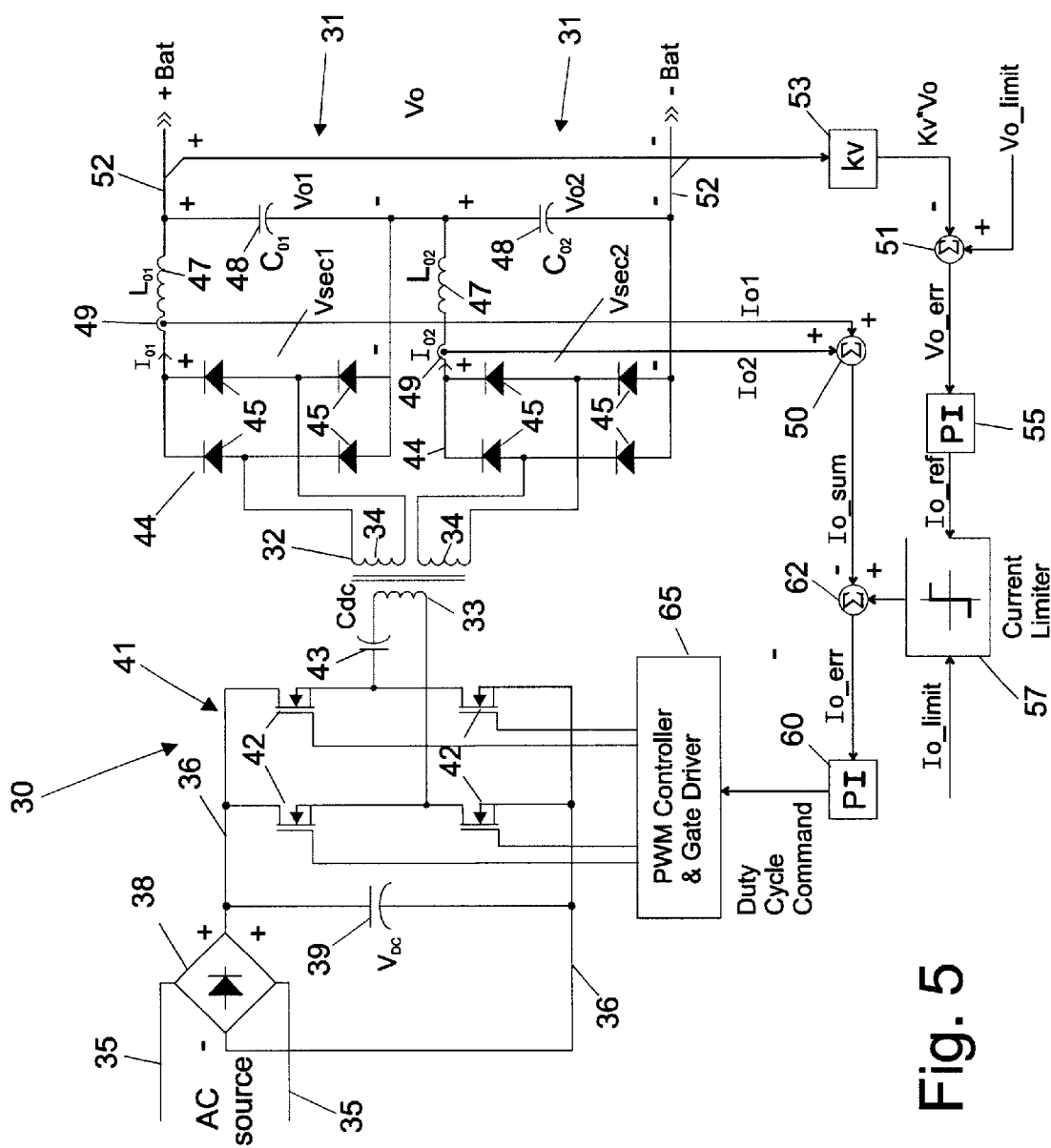
FIG. 5 is a schematic block diagram of a battery charger with a controller in accordance with the present invention showing the full-bridge forward converter having two secondary circuits connected in series.

A preferred controller in accordance with the present invention meets such objectives by closing a current control loop around the charger. The feedback current signal may consist, for example, of the weighted average of the individual output currents of each output stage. An outer voltage loop can be then used to regulate the output voltage of the charger. For exemplification, FIG. 5 shows a full-bridge high voltage SMPS charger 30 having two series-connected output stages 31 and current and voltage feedback control loops. The current feedback signal, Io_sum, is composed of the sum, at 50, of the two output inductor currents Io1 and Io2 obtained from current sensors 49. The voltage feedback signal, Vo, is the sum, at 51, of the output voltages of each output stage, namely Vo1 and Vo2, which is available at the output terminals 52 for charging a battery. The voltage feedback scaling factor, kv, is used at 53 to scale the nominal output voltage level across the output terminals 52 to the control signal level. The outer voltage loop is closed and a proportional-integral (PI) compensation network 55 can be used to regulate the output voltage to the desired level, namely Vo_limit. This allows the charger to implement the constant-voltage method. The PI network 55 generates a current command for the inner current loop, Io_ref. In order to implement the constant-current method, a current limiter circuit 57 is used, the output of which is the current command, Io_ref, up to and capped by Io_limit. If the current command, Io_ref, is lower than Io_limit the charger will be in constant-voltage mode. On the other hand, if the current command, Io_ref, is higher than Io_limit the charger will be in constant-current mode. The current limiter 57 output signal is provided to a summing junction 62 which subtracts the signal Io_sum from the current limiter output signal to provide a signal Io_err. Io_err is provided as the input to another PI compensation network 60 that is used as part of the current loop to regulate the charger current to the desired level. A PWM controller and gate drive 65, e.g., the Unitrode UC3525PWM control IC, can be used to generate the required PWM control and gate drive levels to drive the gate controlled power devices 42 of the inverter 41 at a relatively high switching frequency, e.g., 50 KHz, with the PWM controller controlling the duty cycle of the output voltage waveform of the type $V_p$ illustrated in FIG. 2. The frequency of the PWM modulated output voltage from the inverter 41 can be at a selected high frequency, typically above 1 KHz and preferably around 50 KHz, to allow use of a relatively small and less costly transformer 32.

It is desired that, although the controller regulates the average current of both output stages, leaving the individual currents unregulated, current balancing is ensured, i.e., that the individual currents are well balanced. In addition, it is also desired that, although the controller regulates the total output voltage, the individual output voltages across each of the output capacitors 48, Vo1 and Vo2, are also balanced. These two conditions can be met in the present invention with the use of a buck-based converter topology, such as the forward, half-bridge, or the full-bridge, with average (or total) current and voltage loops closed around the charger. The current feedback signal is effectively composed of the average value of all output currents for the series-connected configuration and the sum for the parallel-connected configuration but the current feedback signal effectively represents the average of the output inductor currents since the sum of the currents is proportional to the average current. The voltage feedback signal is the effective charger output voltage across the output terminals 52 in either configuration.

Figure 7:
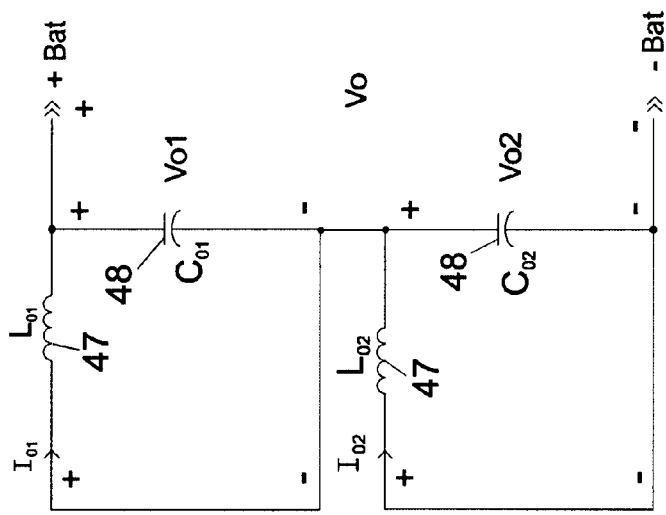
FIG. 7 is the schematic diagram of the equivalent circuit of the two secondary circuits of the circuit of FIG. 5 during the free-wheeling mode.
Figure 6:
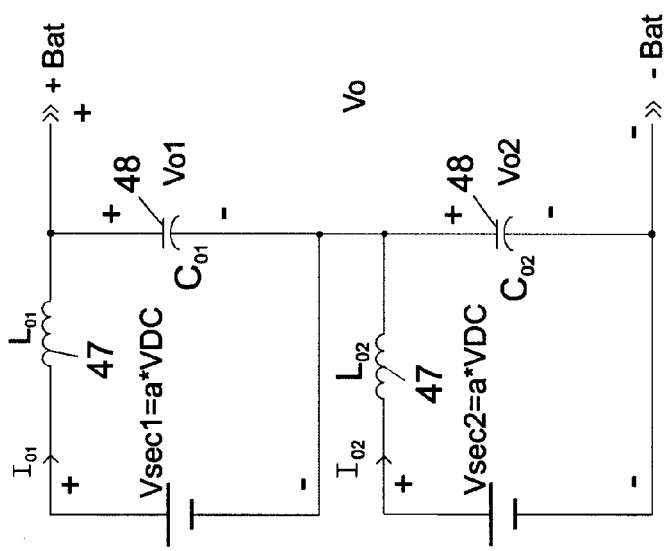
FIG. 6 is a schematic diagram of the equivalent circuit of the two secondary circuits of the circuit of FIG. 5 during the power delivery mode.

To demonstrate the automatic current and voltage balancing feature of the invention, the full-bridge high voltage charger of the type shown in FIGS. 3 and 5 having two series-connected output stages may be considered. The equivalent circuits for both output stages during the power delivery mode and the freewheeling mode are shown in FIGS. 6 and 7, respectively. In response to a disturbance causing the current, e.g. Io1, flowing in one of the output inductors, e.g. Lo1, to increase, the current loop will act to accelerate the return to the balanced state. If this current disturbance occurs while the charger is in constant-current mode, the output current feedback level, which is the sum of both output current stages, will increase, causing the current loop to reduce the duty cycle of the converter. This will cause the effective secondary voltages to decrease and will further cause both Io1 and Io2 to decrease. However, since the increase in Io1 will cause a corresponding increase in Vo1, the output current Io1 will decrease at a higher rate than Io2 will. The same effect will happen if the disturbance in the output current, Io1 occurs when the charger is in constant-voltage mode. In that case, the increase in Io1 will cause the output voltage feedback level to increase. This will prompt the voltage loop to decrease the charger duty cycle command, causing the effective secondary voltages to decrease. Again, this will cause both Io1 and Io2 to decrease, with Io1 decreasing at a higher rate than Io2 decreases because Vo1 is greater than Vo2. The result is automatic average voltage and average current balancing between respective inductor currents and capacitor voltages without the need for any active control of the individual currents or voltages.

Figure 8:
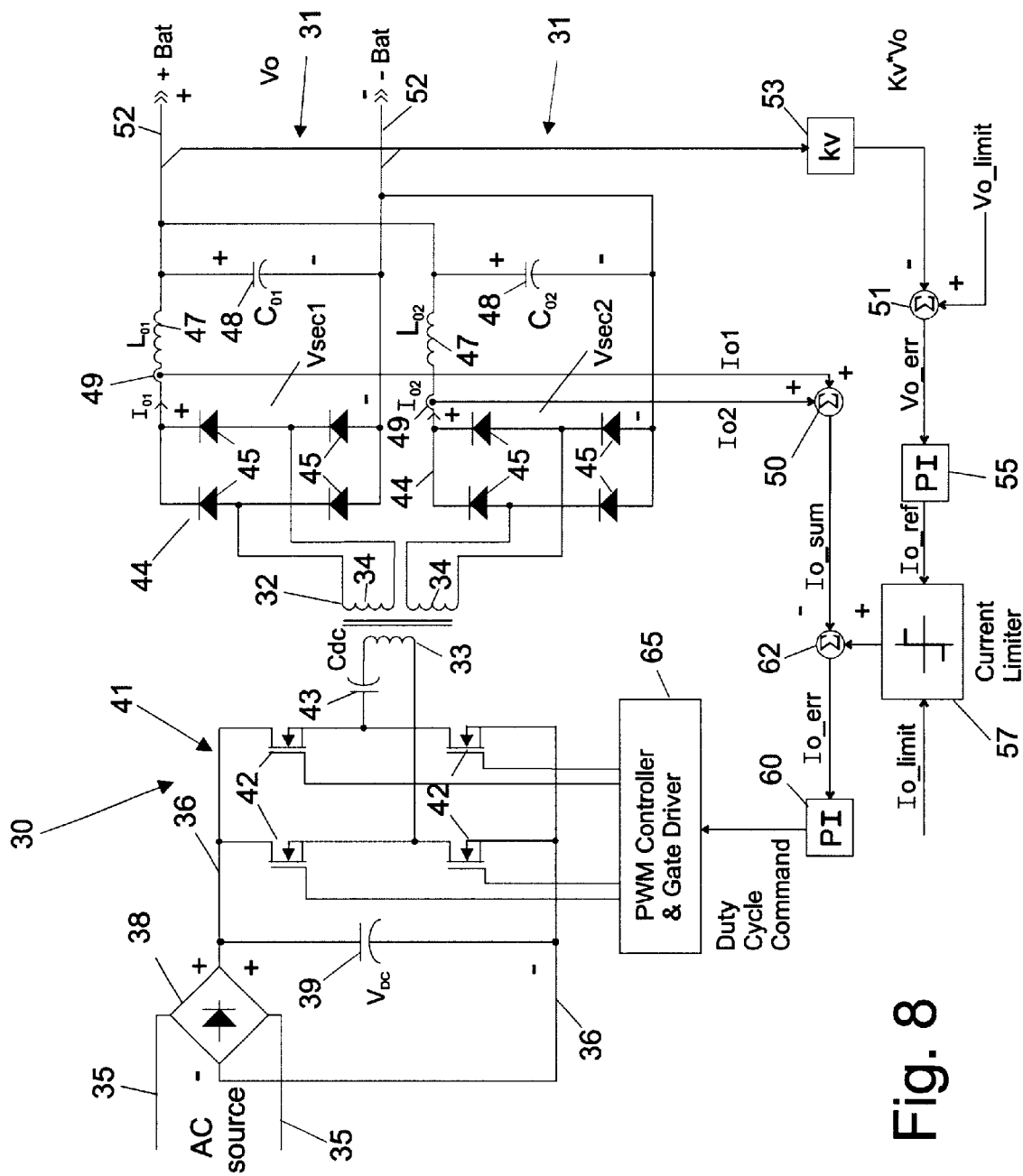
FIG. 8 is a schematic block diagram of the circuit of a battery charger with a controller in accordance with the invention with two secondary circuits configured in a parallel-connected arrangement.

Another advantage of the present invention is the ease of reconfiguration between series-connected and parallel-connected operation. FIG. 8 illustrates a charger in accordance with the invention with two output stages 31 connected in parallel. Other than reconfiguring the physical connection of the output capacitors 48, the control loops do not need to be changed from the circuit of FIG. 5 except for the voltage feedback scaling factor, kv, applied at 53. The voltage feedback scaling factor kv for the series-connected configuration will be half of that factor for the parallel-connected configuration in a case having two secondary windings and two output stages 31. In the battery charger 30 of the present invention, adjusting the voltage feedback scaling factor during reconfiguration can be carried out, for example, by switching between pre-defined resistor values, or alternatively, by adjusting a potentiometer. In this way, none of the command levels or the compensation networks in the controller need to change. It is seen that the circuit of FIG. 8 utilizes the same controller as that of FIG. 5 reconfigured by the scaling factor kv for parallel-connected operation.

As an example of the series/parallel reconfiguration of the invention, if the 800V/10 A two-stage series-connected charger is reconfigured by connecting the output stages 31 and the output capacitors 48 in parallel, a 400V/20 A charger is obtained. This reconfiguration flexibility allows one charger configuration to be used for both types of chargers, which simplifies the assembly process and minimizes changes between product lines.

The invention can be further extended to encompass more than two series-connected or parallel-connected output capacitors 48. For example, a 400V charger may be configured using three series-connected output stages with each output capacitor supplying 133.3V. This allows the use of Schottky diodes as the diodes 45 having minimal or no reverse recovery. However, the benefit of reducing reverse recovery losses in the rectifier diodes 45 must be balanced with the addition of more output stages 31. The battery charger in accordance with the present invention is also suitable for arrangement in alternative network combinations, such as, for example, in the parallel combination of two series-connected strings of output stages 31 with output capacitors 48, wherein the respective ends of the two strings of stages 31 are connected in parallel. A corresponding adjustment to the voltage feedback scaling factor, kv, at the scaling block 53, is all that is necessary to complete the reconfiguration for charging within a suitable voltage and current range for this arrangement.

Figure 9:
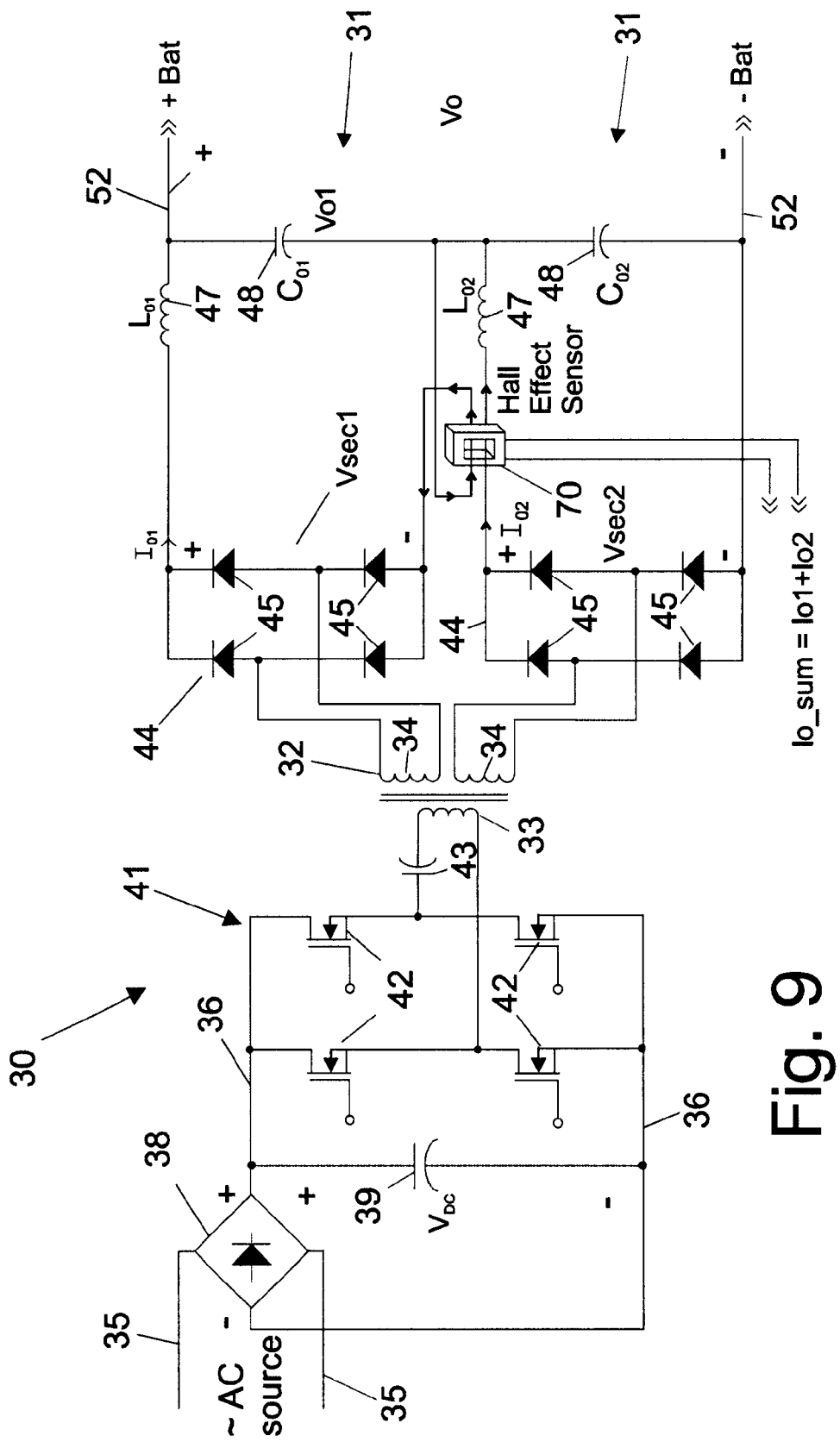
FIG. 9 is a schematic block diagram of the battery charger circuit of FIG. 5 including a preferred arrangement for current feedback.

Since the current feedback signal for both the series-connected and parallel-connected configuration is the sum of the individual output currents, a single Hall-effect current sensor can be used for the current sensors 47. To obtain the sum of the output currents, the individual output current paths (wires) from each stage are looped through the same sensor. FIG. 9 shows a preferred arrangement for sensing the total current for a series-connected high voltage SMPS charger using a Hall-effect sensor 70. In this embodiment, there is no need for a summation circuit in the controller. Note that the same current sum is used in the feedback loop of the parallel-connected configuration, which further simplifies configuring the charger for either series or parallel operation.

Figure 10:
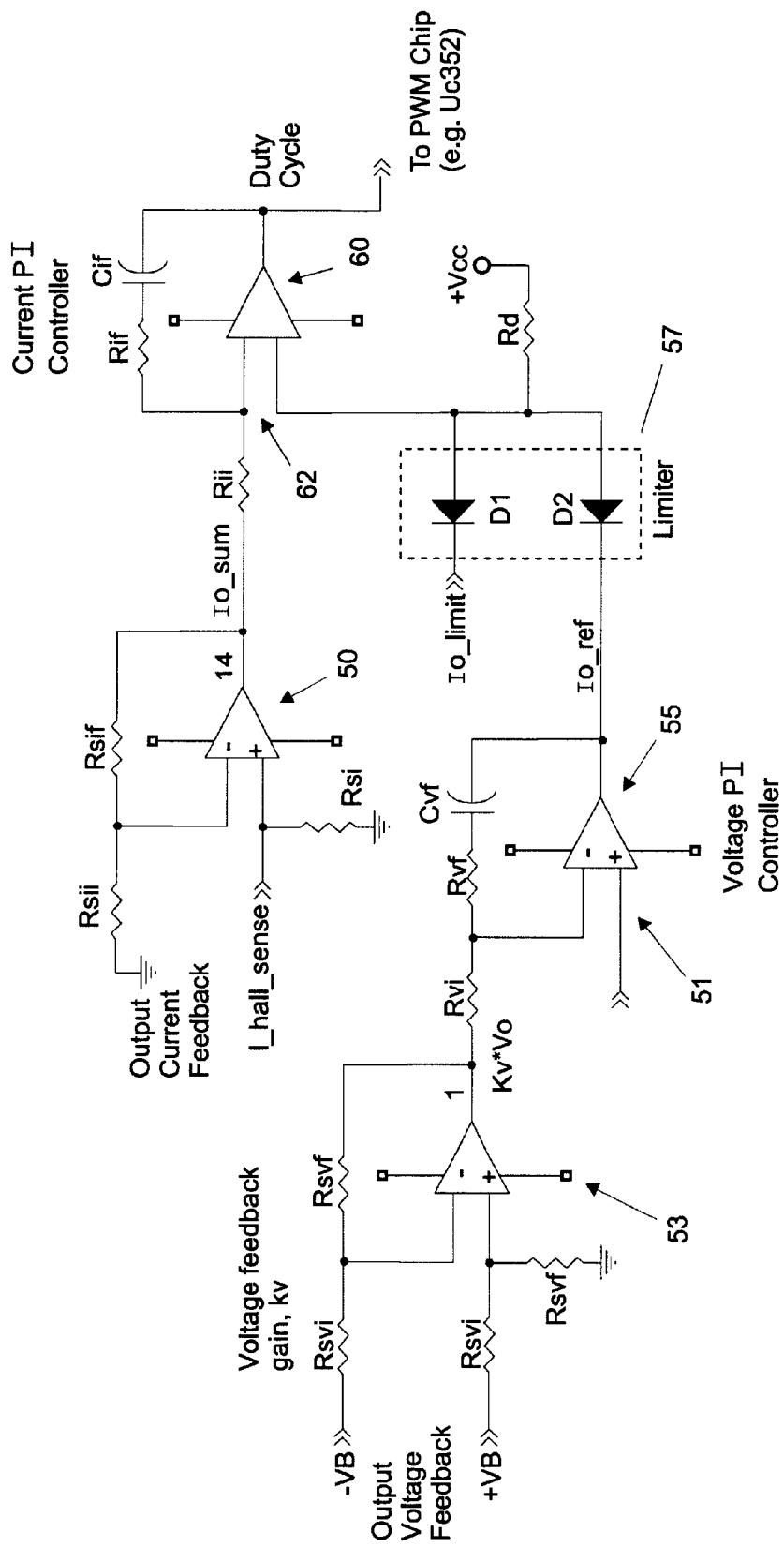
FIG. 10 is a schematic circuit diagram of a portion of the controller in accordance with the present invention illustrating the feedback and limiting circuitry.

An example of the implementation of the control loops is shown in FIG. 10. If a Hall-effect current sensor 70 is used as in FIG. 9, a current sense resistor, Rsi, is used to generate a voltage feedback level at the output of an amplifier U1 (acting as the summer 50), corresponding to the sum of the output currents. The output voltage is fed back through a differential amplifier U2, providing the scaling function 53, where the voltage feedback scaling factor, kv, is set by the ratio of resistors Rsvf to Rsvi. The voltage P1 loop 55 is configured using an amplifier U3, as well as resistors Rvi, Rvf, and capacitor Cvf. The limiter 57 is realized using a simple minimum detector using diodes D1 and D2, and a resistor RD connected to Vcc. Finally, the current P1 loop 60 is configured using an amplifier U4, as well as resistors Rii, Rif, and a capacitor Cif. The foregoing circuit implementation is for purposes of illustration, and it is understood that any suitable implementation may be utilized. For example, as an alternative, the controller can be a microprocessor or DSP that digitally process the signals using digital circuits alone or in combination with software.

Figure 11:
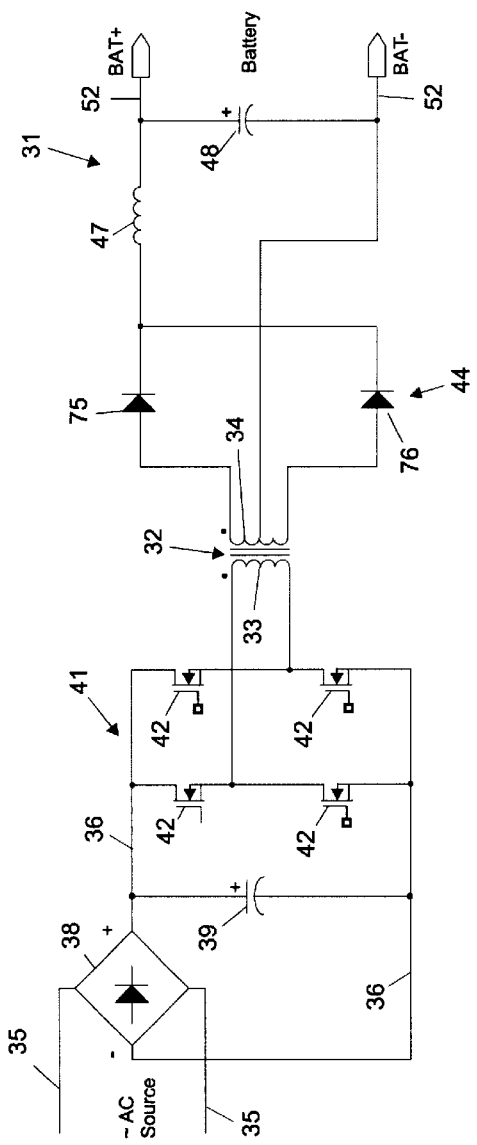
FIG. 11 is a schematic diagram of a full-bridge buck-based circuit topology with a push-pull rectifier that may be utilized in the invention.
Figure 12:
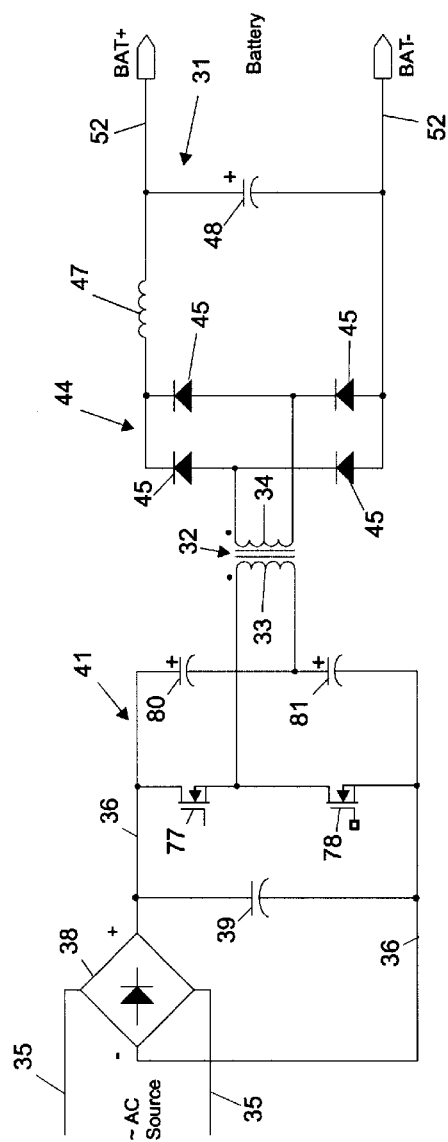
FIG. 12 is a schematic diagram of a half-bridge buck-based circuit topology that may be utilized in the invention.
Figure 13:
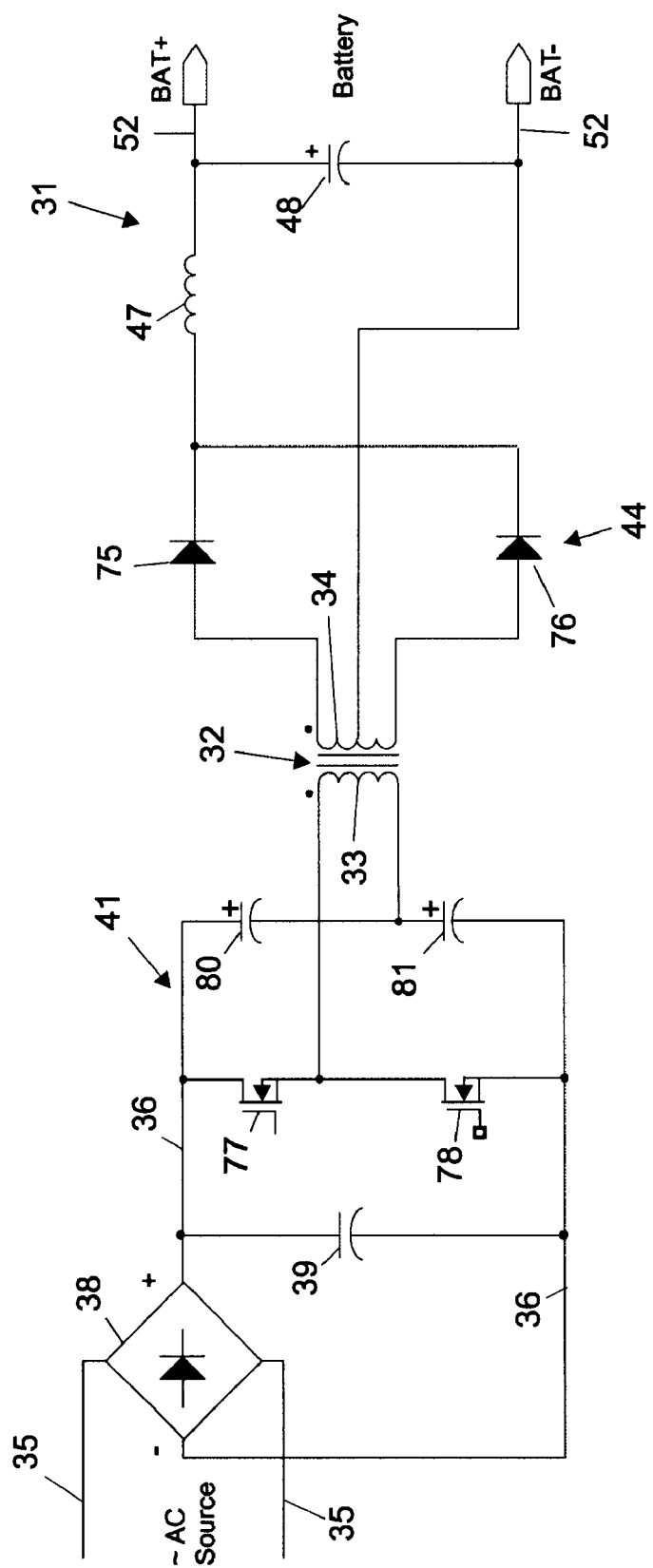
FIG. 13 is a schematic diagram of a half-bridge buck-based circuit topology with a push-pull rectifier that may be utilized in the invention.
Figure 14:
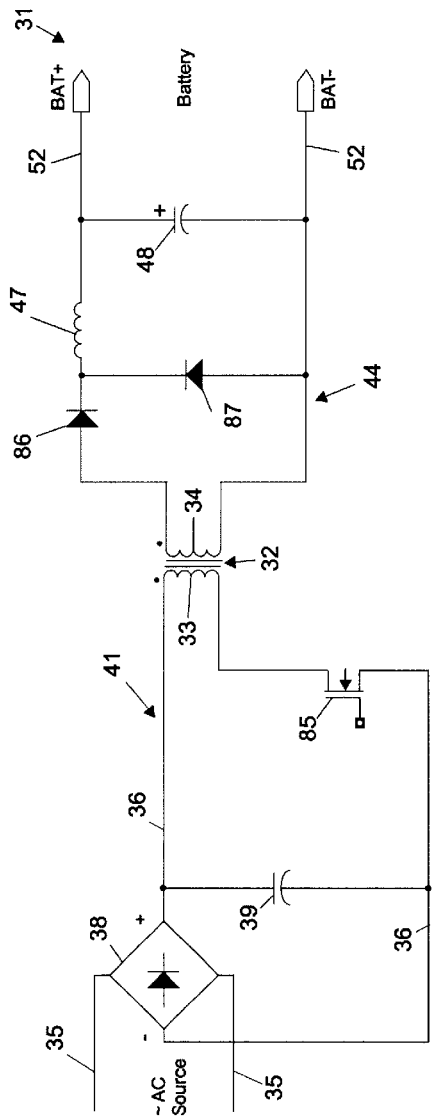
FIG. 14 is a schematic diagram of a single switch forward buck-based circuit topology that may be utilized in the invention.
Figure 15:
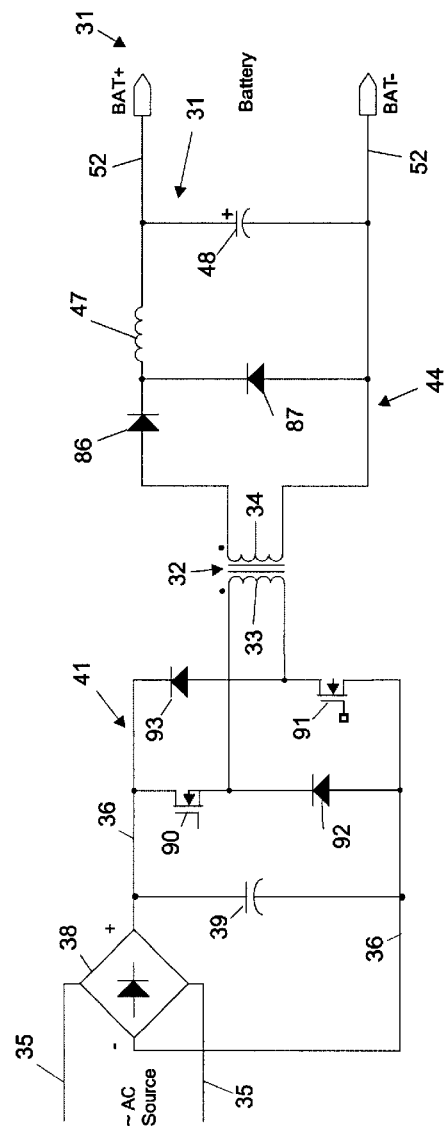
FIG. 15 is a schematic diagram of a two switch forward buck-based circuit topology that may be utilized in the invention.

As noted above, the invention may be implemented using any suitable circuit topology, including various buck-based DC-to-AC converters and rectification circuits. For example only, various converter and rectification circuit topologies that may be used are illustrated in FIGS. 11–15. In each of these views, a single output stage 31 is shown, it being understood that multiple similar output stages would be utilized in accordance with the invention. FIG. 11 illustrates a full-bridge buck-based DC-to-AC converter 41 and an output stage 31 with a push-pull rectification circuit 44 having two diodes 75 and 76 and a center tapped transformer secondary 34. FIG. 12 illustrates a topology with a buck-based DC-to-AC converter 41 having two controlled switching devices 77 and 78 and two capacitors 80 and 81, and a full-bridge rectification circuit 44. FIG. 13 illustrates a topology having a half-bridge buck-based DC-to-AC converter 41 as in FIG. 12, and a push-pull rectifier 44 as in FIG. 11. FIG. 14 illustrates a forward buck-based DC-to-AC converter 41 having a single switch 85, and a half-wave rectification circuit 44 having two diodes 86 and 87. FIG. 15 illustrates a forward buck-based topology with a DC-to-AC converter 41 having two switches 90 and 91 and two diodes 92 and 93, and a half-wave rectification circuit 44 with two diodes 86 and 87 as in FIG. 14.

It is understood that the invention is not confined to the particular embodiments set forth herein as illustrative, but embraces all such forms thereof as come within the scope of the following claims.

What is claimed is:

1. A battery charger comprising:
   (a) a transformer having at least one primary winding and a plurality of secondary windings;
   (b) a buck-based DC-to-AC converter having an arrangement of controllable switching devices, input terminals that may be connected to a DC source, and output terminals connected to the primary winding of the transformer;
   (c) a plurality of output stage circuits, an output stage circuit connected to each secondary winding, wherein each output stage circuit has a rectification circuit connected across a secondary winding and connected to a low-pass filter which includes an output to provide filtered DC voltage across output terminals of each output stage circuit;
   (d) a positive output terminal and a negative output terminal of the battery charger, the output terminals of the output stage circuits connected across the battery charger output terminals in a series or parallel arrangement; and
   (e) a controller connected to the controllable switching devices to switch them on and off periodically so as to transfer energy from the input terminals of the DC-to-AC converter to the output stage circuits with control of the total voltage and current from the output stage circuits wherein the controller receives a feedback signal proportional to the average of the individual currents in each output inductor of each output stage circuit wherein the controller further receives a feedback signal representing the voltage across the output terminals of the battery charger and controls the switching of the switching devices based on the average current feedback signal and the voltage feedback signal.

2. The battery charger of claim 1 wherein the output terminals of each output stage circuit are connected in series between the positive output terminal and the negative output terminal of the battery charger.

3. The battery charger of claim 2 further comprising a plurality of batteries connected in a string in series between the output terminals of the battery charger.

4. The battery charger of claim 1 wherein the output terminals of each output stage circuit are connected in parallel between the positive output terminal and the negative output terminal of the battery charger.

5. The battery charger of claim 1 further including a DC source, connected to the DC-to-AC converter, which comprises a full-bridge rectifier, input terminals of which may be supplied by an AC source, and a capacitor connected across the output of the rectifier.

6. The battery charger of claim 1 wherein one of the DC-to-AC converter output terminals is connected to the primary winding through a DC-blocking capacitor.

7. The battery charger of claim 1 wherein the transformer has a single primary winding and the secondary windings have equal numbers of turns.

8. The battery charger of claim 1 wherein the circuit topology of the DC-to-AC converter is selected from the group consisting of forward, half-bridge, and full-bridge converters.

9. The battery charger of claim 1 wherein the controllable switching devices of the DC-to-AC converter are power MOSFETs or IGBTs.

10. The battery charger of claim 1 wherein the rectification circuit in each output stage circuit comprises diodes connected in a full wave bridge rectifier.

11. The battery charger of claim 10 wherein the diodes of the rectification circuit are diodes having low reverse recovery characteristics.

12. The battery charger of claim 11 wherein the rectifier diodes of the rectification circuit are selected from the group consisting of ultrafast, Stealth, and Schottky diodes.

13. The battery charger of claim 1 wherein the controller receives feedback signals representing the individual currents in each output inductor of each output stage circuit and averages these signals to form the average current feedback signal, wherein the controller includes a pulse generator and gate drive circuit to provide pulsed periodic control signals at a selected frequency to the DC-to-AC converter switching devices.

14. The battery charger of claim 1 wherein the controller includes an adjustable scaling factor that scales the feedback signal representing the voltage across the battery charger output terminals to form a scaled voltage feedback signal.

15. The battery charger of claim 14 wherein the controller regulates the scaled voltage feedback signal representing the voltage across the battery output terminals to a commanded value, Vo_limit.

16. The battery charger of claim 1 wherein the controller regulates the average current feedback signal using an inner control loop at a first bandwidth, and wherein the controller regulates the voltage across the battery charger output terminals using an outer control loop at a second bandwidth lower than the first bandwidth.

17. The battery charger of claim 16 wherein the controller operates in constant-voltage mode when the average current feedback signal is below a specified upper current limit, and wherein the controller operates in constant-current mode when the average current feedback signal exceeds the specified upper current limit.

18. The battery charger of claim 16 wherein the inner control loop of the controller further includes a proportional-integral compensation network.

19. The battery charger of claim 16 wherein the outer control loop of the controller further includes a proportional-integral compensation network.

20. A battery charger comprising:
(a) a transformer having at least one primary winding and a plurality of secondary windings;
(b) a DC source comprising a rectifier having input terminals that may be supplied by an AC source and providing rectified DC output voltage;
(c) a buck-based DC-to-AC converter having an arrangement of controllable switching devices, input terminals connected to the DC source to receive the output voltage therefrom, and output terminals connected to the primary winding of the transformer;
(d) a plurality of output stage circuits, an output stage circuit connected to each secondary winding, wherein each output stage circuit has a rectification circuit connected across a secondary winding and connected to a low-pass filter which includes an output inductor and an output capacitor to provide filtered DC voltage across output terminals of each output stage circuit;
(e) a positive output terminal and a negative output terminal of the battery charger, the output terminals of the output stage circuits connected across the battery charger output terminals in a series or parallel arrangement; and
(f) a controller connected to the controllable switching devices to switch them on and off periodically so as to transfer energy from the input terminals of the DC-to-AC converter to the output stage circuits with control of the total voltage and current from the output stage circuits, wherein the controller receives a feedback signal proportional to the average of the individual currents in each output inductor of each output stage circuit, wherein the controller further receives a feedback signal representing the voltage across the output terminals of the battery charger and controls the switching of the switching devices based on the average current feedback signal and the voltage feedback signal, wherein the controller includes a pulse generator and gate drive circuit to provide pulsed periodic control signals at a selected frequency to the DC-to-AC converter switching devices.

21. The battery charger of claim 20 wherein the output terminals of each output stage circuit are connected in series between the positive output terminal and the negative output terminal of the battery charger.

22. The battery charger of claim 21 further comprising a plurality of batteries connected in a string in series between the output terminals of the battery charger.

23. The battery charger of claim 20 wherein the output terminals of each output stage circuit are connected in parallel between the positive output terminal and the negative output terminal of the battery charger.

24. The battery charger of claim 20 wherein the DC source comprises a full-bridge rectifier, input terminals of which may be supplied by an AC source, and a capacitor connected across the output of the rectifier.

25. The battery charger of claim 20 wherein one of the DC-to-AC converter output terminals is connected to the primary winding through a DC-blocking capacitor.

26. The battery charger of claim 20 wherein the secondary windings have equal numbers of turns.

27. The battery charger of claim 20 wherein the circuit topology of the DC-to-AC converter is selected from the group consisting of forward, half-bridge, and full-bridge converters.

28. The battery charger of claim 20 wherein the controller includes an adjustable scaling factor that scales the feedback signal representing the voltage across the battery charger output terminals to form a scaled voltage feedback signal.

29. The battery charger of claim 28 wherein the controller regulates the scaled voltage feedback signal representing the voltage across the battery output terminals to a commanded value, Vo_limit.

30. The battery charger of claim 20 wherein the controller regulates the average current feedback signal using an inner control loop at a first bandwidth, and wherein the controller regulates the voltage across the battery charger output terminals using an outer control loop at a second bandwidth lower than the first bandwidth.

31. The battery charger of claim 30 wherein the controller operates in constant-voltage mode when the average current feedback signal is below a specified upper current limit, and wherein the controller operates in constant-current mode when the average current feedback signal exceeds the specified upper current limit.

32. The battery charger of claim 30 wherein the inner control loop of the controller further includes a proportional-integral compensation network.

33. The battery charger of claim 30 wherein the outer control loop of the controller further includes a proportional-integral compensation network.

34. The battery charger of claim 20 wherein the controllable switching devices of the DC-to-AC converter are power MOSFETs or IGBTs.

35. The battery charger of claim 20 wherein the rectification circuit in each output stage circuit comprises diodes connected in a full wave bridge rectifier.

36. The battery charger of claim 35 wherein the diodes of the rectification circuit are diodes having low reverse recovery characteristics.

37. The battery charger of claim 36 wherein the rectifier diodes of the rectification circuit are selected from the group consisting of ultrafast, Stealth, and Schottky diodes.

38. A method of charging a string of series-connected batteries comprising:
(a) connecting a pair of output leads from a battery charger across a string of series-connected batteries to be charged, the battery charger comprising a transformer having at least one primary winding and a plurality of secondary windings; a buck-based DC-to-AC converter having an arrangement of controllable switching devices, input terminals that may be connected to a DC source, and output terminals connected to the primary winding of the transformer; a plurality of output stage circuits, an output stage circuit connected to each secondary winding, wherein each output stage circuit has a rectification circuit connected across a secondary winding and connected to a low-pass filter which includes an output inductor and an output capacitor to provide filtered DC voltage across output terminals of each output stage circuit; a positive output terminal and a negative output terminal of the battery charger, the output terminals of the output stage circuits connected across the battery charger output terminals in a series arrangement; and a controller connected to the controllable switching devices to switch them on and off periodically so as to transfer energy from the input terminals of the DC-to-AC converter to the output stage circuits with control of the total voltage and current from the output stage circuits;
(b) controlling the controllable switches in the DC-to-AC converter circuit with the controller operating in voltage-mode when a signal proportional to the average of the currents in the output inductors is below a prescribed limit, and controlling the controllable switches in the converter circuit with the controller operating in current-mode when a signal proportional to the average of the currents in the output inductors is above the prescribed limit, by turning the controllable switching devices on and off periodically such that energy transfers to the battery charger output terminals for charging the string of series-connected-batteries.

39. A method of reconfiguring a high voltage battery charger from charging with a parallel network arrangement of output capacitors to charging with a series network arrangement of output capacitors, the high voltage battery charger having a transformer having a primary winding and a plurality of secondary windings; a buck-based DC-to-AC converter having an arrangement of controllable switching devices, input terminals that may be connected to a DC source, and output terminals connected to the primary winding of the transformer; a plurality of output stage circuits, an output stage circuit connected to each secondary winding, wherein each output stage circuit has a rectification circuit connected across a secondary winding and connected to a low-pass filter which includes an output inductor and an output capacitor to provide filtered DC voltage across output terminals of each output stage circuit; a positive output terminal and a negative output terminal of the battery charger, the output terminals of the output stage circuits connected across the battery charger output terminals in a parallel arrangement; and a controller connected to the controllable switching devices to switch them on and off periodically so as to transfer energy from the input terminals of the DC-to-AC converter to the output stage circuits with control of the total voltage and current from the output stage circuits, wherein the controller includes an adjustable scaling factor that scales a feedback signal representing the voltage across the battery charger output terminals to form a scaled voltage feedback signal, comprising:

(a) disconnecting all but a first output stage terminal from the positive output terminal of the battery charger;

(b) disconnecting all but a second output stage terminal from the negative output terminal of the battery charger;

(c) connecting the plurality of output stage circuits in series such that the first output stage terminal is at the most positive position in the series string and the second output stage terminal is the most negative position in the series string; and (d) adjusting the voltage feedback scaling factor to regulate the battery charger output terminal voltage at a desired value.

40. A method of reconfiguring a high voltage battery charger from charging with a series network arrangement to charging with a parallel network arrangement, the high voltage battery charger having a transformer having a primary winding and a plurality of secondary windings; a buck-based DC-to-AC converter having an arrangement of controllable switching devices, input terminals that may be connected to a DC source, and output terminals connected to the primary winding of the transformer; a plurality of output stage circuits, an output stage circuit connected to each secondary winding, wherein each output stage circuit has a rectification circuit connected across a secondary winding and connected to a low-pass filter which includes an output inductor and an output capacitor to provide filtered DC voltage across output terminals of each output stage circuit; a positive output terminal and a negative output terminal of the battery charger, the output terminals of the output stage circuits connected across the battery charger output terminals in a series arrangement; and a controller connected to the controllable switching devices to switch them on and off periodically so as to transfer energy from the input terminals of the DC-to-AC converter to the output stage circuits with control of the total voltage and current from the output stage circuits, wherein the controller includes an adjustable scaling factor that scales a feedback signal representing the voltage across the battery charger output terminals to form a scaled voltage feedback signal, comprising:

(a) disconnecting the output terminals of all output stage circuits from the output terminals of all other output stage circuits, and connecting the positive terminals of all output stage circuits to the positive output terminal of the battery charger;

(b) connecting the negative output terminal of all output stage circuits to the negative output terminal of the battery charger; and (c) adjusting the voltage feedback scaling factor to regulate the battery charger output terminal voltage to a desired value.

41. A controller for controlling the switching of controllable switching devices of a DC to AC converter in a battery charger when operated to charge a series-connected string of batteries, the battery charger having a pair of output terminals that carries a combination of currents flowing in a plurality of output inductors, comprising:

(a) a current feedback sensor providing a signal proportional to the average of the individual currents flowing in the plurality of output inductors;

(b) a voltage feedback sensor providing a signal representing the voltage across the charger output terminals;

(c) an adjustable voltage feedback scaling factor for scaling the voltage feedback signal to within control signal levels;

(d) a current limit threshold voltage that the controller compares to the current feedback signal, wherein the controller causes the circuit to operate in voltage-mode when the current feedback signal falls below the current limit threshold voltage, and wherein the controller causes the circuit to operate in current-mode when the current feedback signal exceeds the current limit threshold voltage; and (e) a voltage command reference signal corresponding to the battery charger output terminal voltage at which the controller regulates the output terminal voltage when the current feedback signal is below the current limit threshold voltage.

42. The controller of claim 41 including means for causing the individual currents flowing in the plurality of output inductors to balance.

43. A control system for controlling the switching of controllable switching devices in a buck-based DC-to-AC converter in a high voltage battery charger connected to a string of series-connected batteries, the high voltage battery charger including a transformer with a primary winding and a plurality of secondary windings, the DC-to-AC converter being connected to the transformer primary winding, an output stage circuit connected to each secondary winding, each output stage circuit having a rectifier and an output inductor and output capacitor and output terminals connectable to a battery to be charged, the output terminals carrying a combination of currents in the output inductors, wherein the control system includes a current sense means for feeding back a signal proportional to the average current of the output inductors, wherein the current feedback signal and a feedback signal representing the voltage across the output terminals are provided as inputs to a controller, a pulse generator and gate drive circuit, wherein the controller provides an output signal on an output line to the pulse generator and gate drive circuit to provide pulsed periodic control signals at a selected frequency to the controllable switching devices in the DC-to-AC converter.

44. The control system of claim 43 wherein the current sense means comprises:
(a) a core having a substantially closed magnetic path;
(b) a plurality of windings of conductors in series with each output stage inductor, each conductor being wound around the core; and
(c) a sense winding wound around the core for forming a current feedback signal, whereby the current feedback signal represents the sum of the individual currents in the output inductors.

45. The control system of claim 44 wherein the circuit topology of the DC-to-AC converter is selected from the group consisting of forward, half-bridge, and full-bridge converters.

46. The control system of claim 44 wherein the feedback signal representing the voltage across the output terminals is scaled by an adjustable scaling factor to control signal levels.

47. The control system of claim 44 wherein the controller regulates the average current feedback signal using an inner control loop having a first control bandwidth, and wherein the controller regulates the voltage across the battery charger output terminals using an outer control loop at a second control bandwidth lower than the first bandwidth.

48. The control system of claim 47 wherein the first control bandwidth is at least 10 times higher than the second control bandwidth.

49. The control system of claim 47 wherein the inner control loop of the controller further includes a proportional-integral compensation network.

50. The control system of claim 47 wherein the outer control loop of the controller further includes a proportional-integral compensation network.

51. The control system of claim 47 wherein the controller operates in constant-voltage mode when the average current feedback signal is below a specified upper current limit, and wherein the controller operates in constant-current mode when the average current feedback signal exceeds the specified upper current limit.

52. The control system of claim 51 wherein the controller regulates the feedback signal representing the voltage across the output terminals to a commanded value when the controller is operating in the constant-voltage mode.

53. The control system of claim 51 wherein the controller regulates the average current feedback signal to the specified upper current limit when the controller is operating in the constant-current mode.

54. A battery charger comprising:
(a) a full-bridge DC to AC converter having two high-side controllable switching devices, each connectable at a first terminal to a high-side DC source voltage, and two low-side controllable switching devices, each connectable at a first terminal to a low-side DC source voltage, wherein a second terminal of a first high-side controllable switching device is connected to a second terminal of a first low-side controllable switching device, forming a first intermediate junction, and a second terminal of a second high-side controllable switching device is connected to a second terminal of a second low-side controllable switching device forming a second intermediate junction;
(b) a transformer having a primary winding and a plurality of secondary windings having equal members of turns, wherein a first terminal of the primary winding is connected to the first intermediate junction of the full-bridge inverter, and a second terminal of the primary winding is connected through a DC blocking capacitor to the second intermediate junction of the full-bridge inverter;
(c) a plurality of output stage circuits, one output stage circuit connected to each secondary winding, wherein each output stage circuit comprises:
(i) a rectification circuit connected to the secondary winding;
(ii) an output inductor connected to the rectification circuit,
(iii) an output capacitor connected to the output inductor, the output capacitor connected between output terminals of the output stage circuit;
(d) a positive battery charger output terminal and a negative battery charger output terminal, wherein the output terminals of the output stages are connected across the positive and negative battery charger output terminals in a series or parallel arrangement;
(e) a controller connected to the controllable switching devices to switch them on and off periodically so as to transfer energy to the positive and negative output terminals, wherein the controller receives a feedback signal proportional to the average of the individual currents in each output inductor of each output stage, wherein the controller further receives a signal representative of the voltage across the output terminals of the battery charger and controls the switching of the switching devices based on the average current feedback signal and the voltage feedback signal; and
(f) a DC source connected to the DC-to-AC converter.

55. The battery charger of claim 54 wherein the DC source comprises a full-bridge rectifier, the input terminals of which are supplied by an AC source, and a capacitor connected across the output of the full-bridge rectifier.

56. The battery charger of claim 54 wherein the controlled switching devices are power MOSFETs or IGBTs, the rectification circuit comprises a full wave bridge rectifier circuit, the rectifier diodes in the rectification circuit comprise diodes having low reverse recovery characteristics, wherein the controller includes a pulse generator and gate drive circuit to provide pulsed periodic control signals at a selected frequency to the full-bridge inverter switching devices, wherein the controller regulates the scaled voltage feedback signal representing the voltage across the positive and negative battery charger output terminals to a commanded value, Vo_limit, the controller regulates the average current feedback signal using an inner control loop at a first bandwidth, and wherein the controller regulates the voltage across the battery charger output terminals using an outer control loop at a second bandwidth lower than the first bandwidth, wherein the controller operates in constant-voltage mode when the average current feedback signal is below a specified upper current limit and the controller operates in constant-current mode when the average current feedback signal exceeds the specified upper current limit, wherein the inner control loop of the controller further includes a proportional-integral compensation network, and the outer control loop of the controller further includes a proportional-integral compensation network.

57. The battery charger of claim 54 wherein the rectifier diodes of the rectification circuit are selected from the group consisting of ultrafast, Stealth, and Schottky diodes.

* * * * *